Patented Feb. 19, 1935

1,992,111

UNITED STATES PATENT OFFICE 1,992,111

SEPARATION OF SECONDARY AND TERTIARY AMINES

Frithjof Zwilgmeyer, South Milwaukee, Wis., assignor, by mesne assignments, to E. I. du Pont de Nemours & Company, a corporation of Delaware No Drawing. Application June 20, 1931, Serial No. 545,719½

11 Claims.  (Cl. 260—128)

This invention relates to a process for separating secondary and tertiary amines.

More specifically, this invention deals with the separation of N,N-dialkyl-aryl-amines from N-mono-alkyl-aryl-amines in mixtures as they are naturally formed in the alkylation of aromatic amines, such as, for example, by reacting the aromatic amines with alcohols under pressure.

It is to be understood that throughout the disclosure I use the term "alkyl" in the generic sense to include aralkyl residues, such as, for example, benzyl residues as well as aliphatic alkyl residues such as methyl, ethyl and the like.

It is well known that mixtures of N-mono alkyl and N,N-dialkyl anilines cannot be readily separated from each other by fractional distillation. It has been proposed in the art to separate these compounds by converting the N-mono-alkyl aniline into a carbamyl chloride, which is water-insoluble, while the N,N-dialkyl derivative is converted into the water-soluble hydrochloride, and then separating the two by filtration and regenerating the separate bases by known methods. This process, however, has certain material drawbacks, and from time to time various modifications thereof, or improvements thereover, have been proposed. Among other methods, it has been proposed to convert the N-mono-alkyl-aniline into its phthaliminic acid by the aid of phthalic anhydride, neutralizing the acid with dilute caustic and separating the aqueous solution of the alkali salt of the N-monoalkyl-aniline phthaliminic acid from the water-insoluble N,N-dialkyl-aniline. (See for example, U. S. Patent No. 1,695,372 and British Patent No. 333,349.)

I have now found that N-monoalkyl-aryl-amines can be readily separated from the corresponding N,N-dialkyl-aryl-amines by treating the mixture with the anhydride of an aliphatic dicarboxylic acid, such as, for example, maleic or succinic anhydride, and then adding dilute caustic alkali to neutralize the free acid group, and separating the aqueous layer from the oily layer.

It is an object of this invention to provide a process of separating secondary amines from tertiary amines, including treatment with an aliphatic anhydride.

More specifically, it is an object of this invention to provide an efficient and economical process of separating N-monoalkyl-aryl-amines from corresponding N,N-dialkyl-aryl-amines including treatment with an aliphatic anhydride.

Other and further important objects of this invention will become apparent from the following description and appended claims.

The reaction with the aliphatic anhydride in my process is probably analogous to the process of treatment with phthalic anhydride. The N-mono-alkyl-aniline reacts with the aliphatic anhydride to form probably a carboxy-alkyl-imide grouping. Thus in the case of maleic anhydride the reaction is most probably as follows:

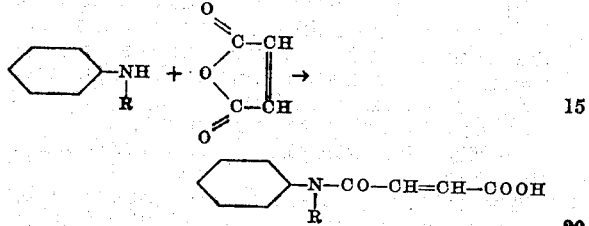

(wherein R stands for alkyl).

The dialkyl derivative, on the other hand, does not react. Addition of dilute caustic to the mixture neutralizes the carboxylic acid group of the N-mono alkyl aryl amine-anhydride reaction product, rendering it water-soluble. The aqueous solution of the neutralized reaction product then separates from the oily N,N-dialkyl-aniline layer, and may be readily removed therefrom. The N,N-dialkyl-aryl-amine is thus obtained at once in pure form, while the monoalkyl compound may be recovered from the aqueous solution by heating with a mineral acid to hydrolyze the compound at the imide group, then converting the base into a water-soluble mineral salt thereof, and neutralizing again with alkali to liberate the free base, which then separates as an oily layer.

The separation effected by the above method is very sharp, each of the bases containing not more than about 0.1% of the other. The efficiency of the process is improved if the product to be separated is first analyzed, and the reagents used (aliphatic anhydride and alkali) in quantities not very much exceeding the stoichiometric proportions. Of course, care must be taken that the quantity of aliphatic anhydride used is not less than that theoretically necessary to react with the quantity of N-monoalkyl-aryl-amine present, as otherwise the said mono-amine will not be completely eliminated and consequently, although the eventually recovered N-monoalkyl-aryl-amine will be substantially pure, the more desirable N,N-dialkyl-aryl-amine will be contaminated with monoalkyl derivative.

The advantages of my novel process over the phthalic anhydride process are many. First of all, my process opens up a new field of reagents usable for this process. Some of these reagents, for example, maleic anhydride, are quite common in the art and are inexpensive to use, especially if recovered in the process. In my process, maleic anhydride, for example, may be converted in the hydrolyzing treatment to fumaric acid, which is readily recoverable from the final aqueous solution. As is known, fumaric acid is a valuable commercial product.

Another advantage of my process is that, in the case of maleic anhydride, the reaction proceeds quite rapidly, in fact almost instantaneously, thereby shortening the time consumed by the entire operation.

Without limiting my invention to any particular procedure, the following examples in which parts by weight are given, will serve to illustrate my method in its preferred form.

Example 1

43 parts of maleic anhydride are added at room temperature and while stirring to 300 parts of a diethylaniline-monoethylaniline mixture analyzing about 15.3% of monoethylaniline. The reaction is complete in a short time. After continued stirring of the mass for 45 minutes, a solution prepared by mixing 60 parts of caustic soda (40° Bé.) with 60 parts of water is gradually added to the reaction mass until the mixture is just alkaline to phenolphthalein. The mixture now separates into two layers. The upper, oily, layer contains the diethylaniline, and after washing with water yields diethylaniline in a high state of purity. Its monoethylaniline content is less than 0.1%.

The monoethylaniline may be recovered by heating the aqueous layer for about 1½ hours at reflux temperature with an excess of 10% mineral acid, then neutralizing the excess acid with caustic soda to free the base, and allowing it again to separate into layers. The upper, oily layer contains the monoethylaniline. The lower aqueous lawyer may now be again acidified with mineral acid, whereupon fumaric acid precipitates in a very pure state and in a yield substantially corresponding to the quantity of maleic anhydride initially used in the process.

Example 2

To 400 parts of a mixture containing 377 parts of benzyl-ethyl-aniline and 23 parts of monoethyl-aniline, are added at room temperature and while stirring, 22 parts of maleic anhydride. The reaction proceeds very rapidly. After continued stirring for 45 minutes, a solution prepared by mixing 30 parts of caustic soda (40° Bé.) with 30 parts of water is added gradually until the reaction mass is just alkaline to phenolphthalein. The oily layer which separates is withdrawn and washed with water. It constitutes benzyl-ethyl-aniline in a high state of purity and containing less than 0.1% of mono-ethyl-aniline.

From the residual, aqueous reaction mass, the mono-ethyl-aniline and fumaric acid may be recovered as in Example 1.

Example 3

200 parts of a mixture of dimethylaniline and monomethylaniline analyzing about 5% of the latter by weight are treated at room temperature with 10.5 parts of maleic anhydride. After continued stirring for about 45 minutes, a dilute caustic soda solution, preparing as in Example 1, is gradually added until the mixture is just alkaline to phenolphthalein. The oily layer which separates is removed and washed with water to give substantially pure dimethyl-aniline, containing less than 0.1% of monomethyl-aniline. From the residual, aqueous reaction mass, monomethyl-aniline and fumaric acid may be recovered as in Example 1.

In a similar manner other mixtures of N-mono- and N,N-dialkyl-aryl-amines may be separated. In lieu of maleic anhydride, other aliphatic anhydrides may be employed, such as for example, succinic anhydride and the like. Maleic anhydride, however, seems to have a commercial advantage over the use of other aliphatic anhydrides both because of its lower initial cost and because of the commercial value of the fumaric acid which may be recovered from the reaction mass.

My novel process is applicable as well to mixtures containing the N-mono-alkyl-aryl-amine in considerably larger proportions than above indicated. However, since the quantity of anhydride consumed is directly proportional to the quantity of N-mono-alkyl-aryl-amine isolated, it will be found more economical to first fractionally distill the mixture of amines in order to separate as much as possible of the mono-alkyl compound by this relatively inexpensive method. The treatment with aliphatic anhydride need then be applied only to a mixture relatively lean in the mono-alkyl derivative content.

My novel process is also applicable to mixtures containing the primary amine base, the primary amine reacting with the anhydride in the same manner as the mono-alkyl compound, and finding its way together with the latter into the aqueous layer.

Other variations and modifications may be practiced with my novel process, as will be readily understood to those skilled in the art.

In the claims below it should be understood that by the term "alkyl" amines I mean to cover and include aralkyl amines as well, in view of the fact that these compounds are linked to the nitrogen atom through the alkyl group.

I claim as my invention:

1. The process of separating N-mono-alkyl-aryl-amines of the benzene series and N,N-dialkyl-aryl-amines of the benzene series from each other, which comprises reacting a mixture thereof with maleic anhydride, neutralizing with an aqueous alkali solution, separating the two liquid layers thus formed from each other and recovering the fumaric acid from the aqueous layer.

2. The process of separating a N,N-dialkyl-aryl-amine of the benzene series from a N-mono-alkyl-aryl-amine of the benzene series mixed therewith, which comprises treating said mixture with a quantity of maleic anhydride sufficient to react with all the N-mono-alkyl-aryl-amine present in the mixture, neutralizing the reaction mass with an aqueous alkali solution, separating the non-aqueous layer formed from the aqueous layer and recovering fumaric acid from the aqueous layer.

3. The process of separating a N,N-dialkyl-aniline compound from a mixture thereof with incompletely N-alkylated aniline, which comprises treating the mixture with a quantity of maleic anhydride sufficient to react with all the incompletely N-alkylated anilines present, neutralizing the reaction mass with an aqueous alkali solution, allowing the mixture to settle into layers, removing the resulting oily layer from the aqueous layer recovering the incompletely N-alkylated aniline from the aqueous layer and precipitating pure fumaric acid from the aqueous layer after the N-alkylated aniline is removed with a mineral acid.

4. The process of separating a mixture of diethylaniline and mono-ethyl-aniline into its constituents, which comprises treating said mixture with a quantity of maleic anhydride at least equal in molar ratio to the quantity of mono-ethyl-aniline present in the mixture, introducing sufficient alkali into the mixture to neutralize the mono-ethyl-aniline-maleic-anhydride reaction product, introducing sufficient water to dissolve said neutralized reaction product, allowing the mixture to settle into two liquid layers including an aqueous layer and an oily layer, and recovering diethyl-aniline from the oily layer.

5. The process according to claim 4 including in addition the steps of recovering mono-ethyl-aniline from the aqueous layer.

6. In a process for separating a N-mono-alkyl-aryl-amine of the benzene series from a N,N-dialkyl-aryl-amine of the benzene series by reacting the N-mono-alkyl-aryl-amine with maleic anhydride, neutralizing and dissolving the reaction product in water, and separating the aqueous layer thus formed from the N,N-dialkyl-aryl-amine layer, the step which comprises heating the aqueous layer with mineral acid and recovering fumaric acid therefrom.

7. The process of separating N-mono-alkyl-anilines and N,N-dialkyl-anilines from each other, which comprises reacting a mixture thereof with maleic anhydride, neutralizing the reaction mass with an aqueous alkali solution, separating the two liquid layers thus formed from each other and recovering fumaric acid from the aqueous layer.

8. The process of separating an N,N-dialkyl-aniline from an N-mono-alkyl-aniline mixed therewith, which comprises treating said mixture with a quantity of maleic anhydride sufficient to react with all of the N-mono-alkyl-aniline present in the mixture, neutralizing the reaction mass with an aqueous alkali solution, separating the oily layer formed from the aqueous layer, recovering the pure N,N-dialkyl aniline from the oily layer, heating the aqueous mass with mineral acid, neutralizing the acid with an alkali, allowing the mass to again separate into layers, recovering the N-mono-alkyl aniline from the oily layer, acidifying the lower aqueous layer with mineral acid and recovering fumaric acid from the acidified mass.

9. The process of separating a mixture of an N-mono-alkyl aniline and an N,N-dialkyl aniline into its constituents, which comprises reacting said mixture with a quantity of maleic anhydride sufficient to react with all of the N-mono-alkyl aniline present in the mixture, neutralizing the reaction mass with an aqueous alkali solution, separating the oily layer from the aqueous layer, recovering the N,N-dialkyl aniline from the oily layer, heating the aqueous layer with an excess of mineral acid over that theoretically required to hydrolyze the amide at the reflux temperature, neutralizing the excess acid with caustic, allowing the mass to again separate into layers, recovering the N-mono-alkyl aniline from the upper layer, again acidifying the lower aqueous layer with mineral acid and recovering fumaric acid from the acidified aqueous layer.

10. In the process of separating an N-mono-alkyl aniline from an N,N-dialkyl aniline by reacting the N-mono-alkyl aniline with maleic anhydride, neutralizing and dissolving the reaction product in water and separating the aqueous layer thus formed from the N,N-dialkyl aniline layer, the steps which comprise heating the aqueous layer with an excess of mineral acid over that theoretically required to hydrolyze the amide, neutralizing the excess acid with caustic, allowing the mass to again separate into layers, recovering the N-mono-alkyl aniline from the oily layer, and again acidifying the aqueous layer with mineral acid to recover fumaric acid therefrom.

11. The process of recovering fumaric acid from the reaction mass of maleic anhydride and an N-mono-alkyl aniline obtained in the process of separating a mixture of an N,N-dialkyl aniline and an N-mono-alkyl aniline which comprises heating the reaction product at reflux temperature with an excess of mineral acid over that theoretically required to hydrolyze the amide, neutralizing the mass, allowing the mass to separate into layers, and acidifying the aqueous layer with a mineral acid to precipitate fumaric acid therefrom.

FRITHJOF ZWILGMEYER.